United States Patent [19]

Stange, Jr.

[11] Patent Number: 5,456,147
[45] Date of Patent: Oct. 10, 1995

[54] PRECISION CUTTER SAW

[75] Inventor: Horst Stange, Jr., Park Ridge, Ill.

[73] Assignee: Buehler, Ltd., Lake Bluff, Ill.

[21] Appl. No.: 888,802

[22] Filed: May 27, 1992

[51] Int. Cl.[6] .................................................. B23Q 15/013
[52] U.S. Cl. .................................. 83/74; 83/168; 83/169;
83/411.4; 83/412; 125/13.01; 451/1
[58] Field of Search ............................. 83/72, 167, 168,
83/169, 411.3, 411.4, 412, 415, 703, 733,
952, 74, 403.1; 51/165 R, 165.74, 165.76;
125/13.01; 451/1

[56] References Cited

U.S. PATENT DOCUMENTS

| | | | |
|---|---|---|---|
| 2,649,646 | 8/1953 | Remmen | 83/72 |
| 3,491,638 | 1/1970 | Idlis | 83/412 |
| 3,744,361 | 7/1973 | Van Doorn et al. | 83/37 |
| 4,091,698 | 5/1978 | Obear et al. | 83/34 |
| 4,942,795 | 7/1990 | Linke et al. | 83/72 |
| 5,119,310 | 6/1992 | Moriya | 83/72 X |

*Primary Examiner*—Eugenia Jones
*Attorney, Agent, or Firm*—Banner & Allegretti, Ltd.

[57] ABSTRACT

An automatic saw is provided having a rotatable saw blade for cutting through a workpiece which is carried on a movable arm, which permits the workpiece to be moved into engagement with the saw blade. The saw blade is mounted on a first shaft while the workpiece and arm are mounted on a second, rotary shaft. Typically, a load cell is carried on the second shaft to sense torsional stress created by the pressure of the saw against the workpiece. This torsional stress is a direct measurement of the pressure of the saw against the load cell, and may be used in a feedback system for automatic adjustment of the sawing conditions. Also, it is preferred for the second shaft to be longitudinally movable in an automatic manner by means of a threaded, rotary arrangement for longitudinally advancing and retracting the second shaft between predetermined positions. A rotary encoder may be used to monitor the rotary position of the second shaft and arm.

15 Claims, 5 Drawing Sheets

FIG.6
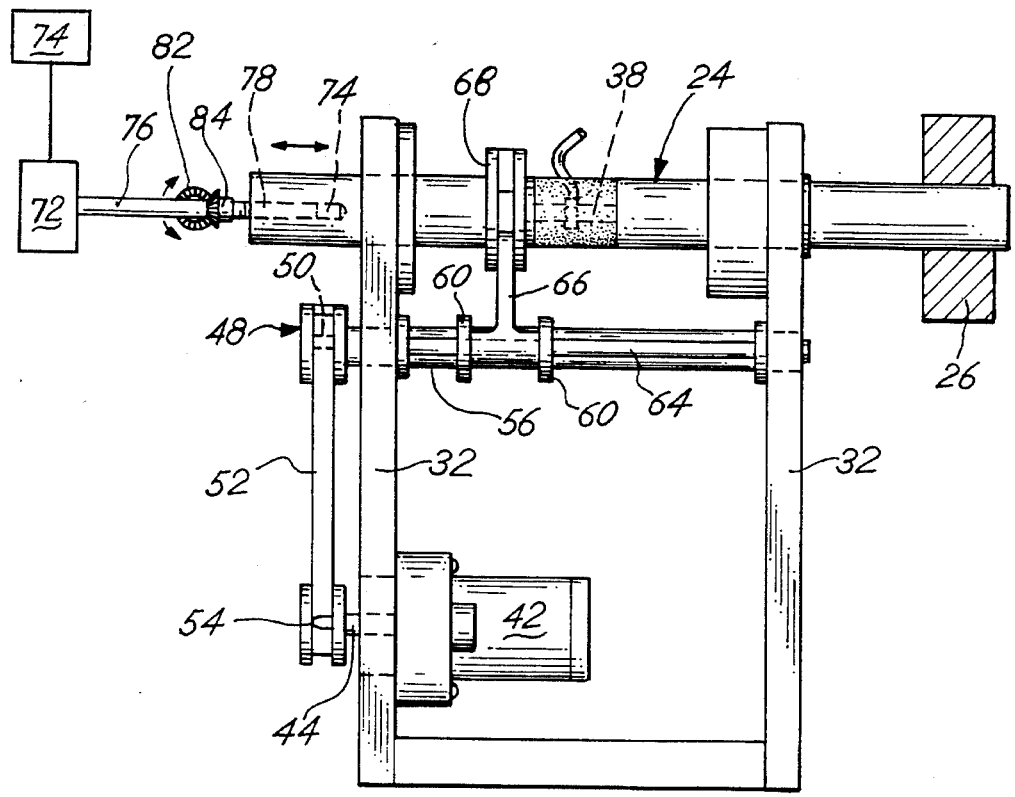
FIG.7
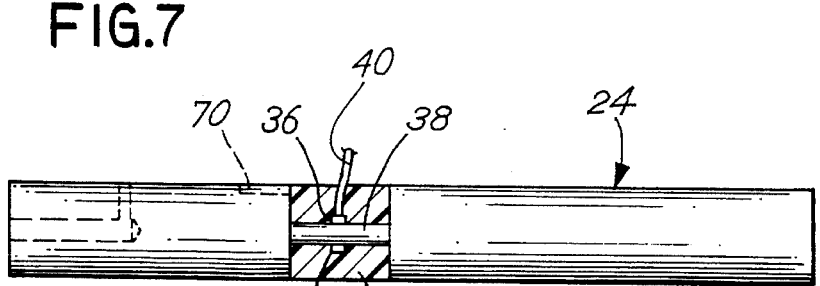
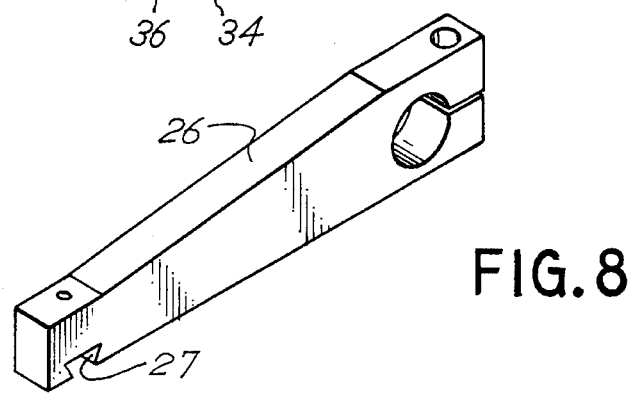
FIG.8

PRECISION CUTTER SAW

BACKGROUND OF THE INVENTION

Precision saws or cutters are well known devices for cutting sections of silicon, bone, minerals, or any other desired material to be cut into thin sections for analysis or use. Buehler Ltd. of Lake Bluff, Ill. sells such a precision cutter under the Trademark AUTOMET. Also, Linke et al. U.S. Pat. No. 4,942,795 shows a precision cutter using a saw blade which cuts a specimen into sections as it is carried on a pivotal arm. The saw apparatus and the blade are carried on a platform which, in turn, is carried on a strain gauge, so that the pressure of the saw against the workpiece can be monitored. However, as a disadvantage of the arrangement as described in the above patent, the strain gauge is always sensing a positive strain which varies somewhat in accordance with the pressure of the saw against the workpiece, because the saw apparatus and platform are carried on the strain gauge. Thus, the precise pressure of the saw against the workpiece must be derived, with possible inaccuracy, rather than being directly measured.

By this invention a saw is provided in which the pressure of the saw against the workpiece can be electronically monitored with high accuracy as a direct readout of a strain gauge. Additionally, the workpiece and the shaft which carries it may be longitudinally adjusted in an automated manner for the rapid sawing of separate sections of the workpiece. Similarly, the sample carrying arm may be electronically positioned in automated manner as a function of signals from sensing means and other controls.

Similarly, other advantages over the prior art, and new features, are provided for the automatic saw of this invention, which may exhibit the advantages as obtained and described in the patent discussed above, as well as exhibiting new advantages over the prior art.

DESCRIPTION OF THE INVENTION

The invention herein relates to an automatic saw of the type having a rotatable saw blade for cutting through a workpiece which is carried on a moveable arm, which permits the workpiece to be moved into engagement with the saw blade for cutting through the workpiece. The rotatable saw blade is mounted on a first shaft, having a saw blade drive motor for rotating the first shaft. A load cell provides an electrical output signal corresponding to a sensed load between the saw and workpiece. Arm means are provided for carrying the workpiece, with arm drive means for moving the arm means toward and away from the saw blade. The arm drive means may be controlled in response to the electrical output signal from the load cell means.

In accordance with this invention, the arm means is carried on a second rotatable shaft, which second shaft comprises the load cell means, positioned to provide the electrical output signal in a manner responsive to torque load exerted on the second shaft through the arm. Specifically, the second shaft may comprise a straight, concentric stainless steel (or the like) rod which defines an integral section of a reduced diameter which is no more than typically about half the diameter of the remaining shaft. The integral section is spaced from the second shaft ends. Strain measuring means are carried on the integral section of reduced diameter, with electrical wires for communicating the signals from the strain measuring means to a microprocessor, for using such signals as at least partial input for the control of the rotational position of the second shaft and arm means.

Additionally, the second shaft may be connected to rotary encoder means, which are of generally conventional design, so that the position of the shaft and arm means may be electronically sensed and controlled. This encoder means may also have a wire for electronically sending signals from the encoder means to the microprocessor as further input for the control of the position of the arm means.

The second shaft is typically also longitudinally moveable. Threaded means are provided for longitudinally advancing and retracting the second shaft between predetermined positions. Motor means operate the threaded means to advance and retract the second shaft. Preferably, the threaded means comprise a worm gear operable in a longitudinal, threaded aperture defined in an end of the second shaft. Thus, rotation of the worm gear causes longitudinal movement of the second shaft and the arm means carried thereon. This may also be accomplished in an automated manner as controlled by instructions punched in by the operator from a control panel.

The first and second shafts preferably have portions that project through a housing wall defining an enclosure having an open sidewall, a peripheral lip, and a floor. The first and second shaft portions which thus project through the housing wall respectively carry the saw blade and the arm means in the enclosure.

The floor of the enclosure defines at least one cam that is at least part of elevating cam means, at a position opposed to the open sidewall mentioned above. A water-tight, open-top drawer having a rim is slidably moveable through the open sidewall, to thus be cammed upwardly by the elevating cam means to cause the rim to engage the peripheral lip. This provides a seal for coolant liquid carried in the drawer.

It is also preferred for dressing stone holding means to be positioned in the drawer in the enclosure, at a position whereby a saw blade mounted on the first shaft engages the dressing stone. A purpose of the dressing stone is to be cut through by the saw blade to clean and unclog the blade. Also, preferably, coolant from the drawer bottom is pumped over the dressing stone as well as the saw blade during the sawing operation.

The automated function of the automatic saw of this invention may, overall, be similar to the automated function of the saw described in the Linke et al. U.S. Pat. No. 4,942,795, with respect to the electronics and the control function of the holding arm for the object to be sawed. Similarly, the saw motor speed may be automatically regulated as described therein. Specifically, an overriding limit of torque on the saw blade motor may be provided to prevent damage to the sample or the saw blade.

Thus, an improved apparatus for obtaining samples for microstructural analysis or the like is provided, having improvements over the prior art.

DESCRIPTION OF THE DRAWINGS

FIG. 6 is an elevational view of the second rotatable shaft and carried arm means, with components removed, showing the longitudinal and rotational drive means for the second shaft;

FIG. 7 is an elevational view of the second rotatable shaft and the strain gauge, with other parts removed; and FIG. 8 is an enlarged, perspective view of the outer end of the arm means, showing the specimen-holding means.

DESCRIPTION OF SPECIFIC EMBODIMENT

Figure 3:
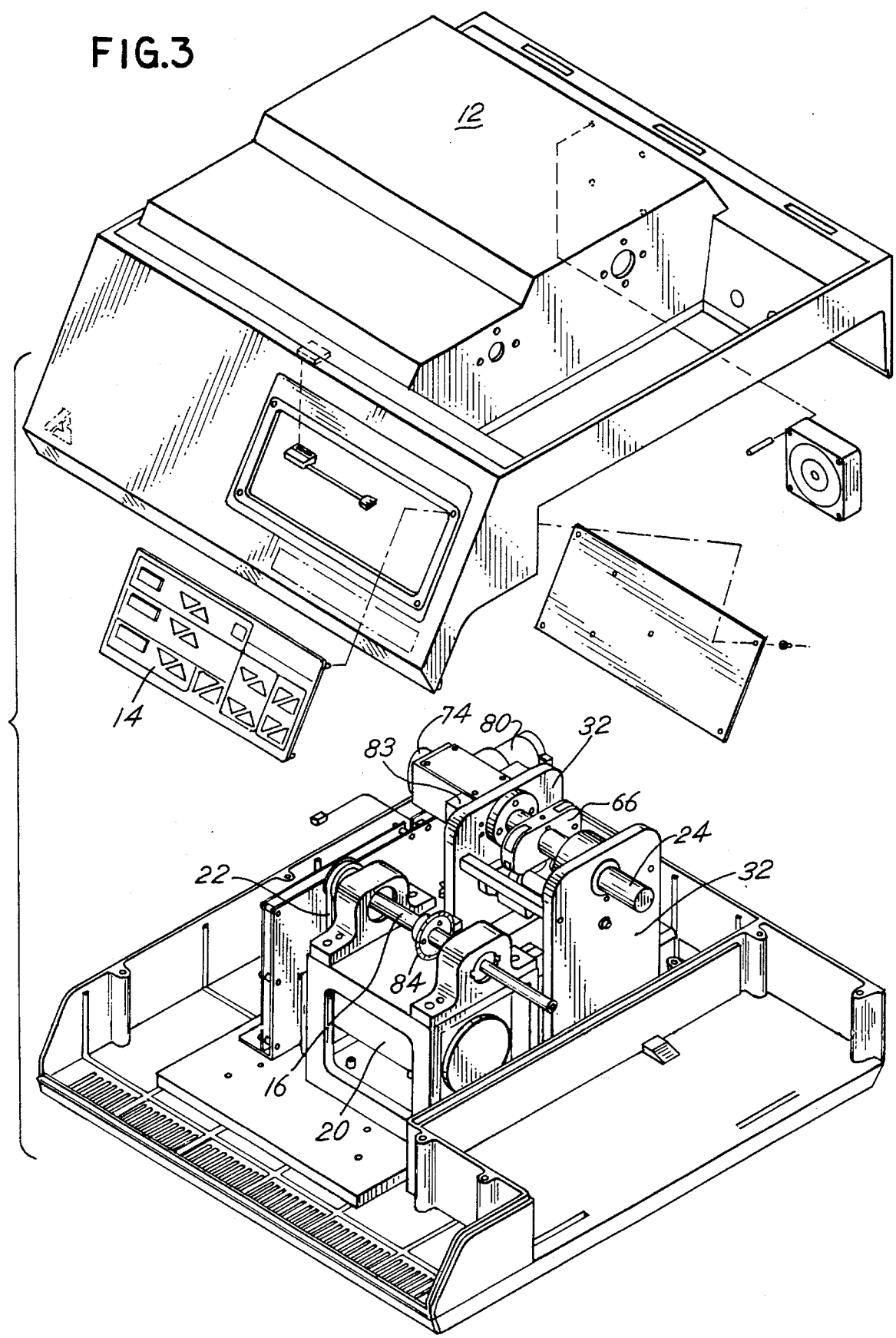
FIG. 3 is an enlarged, partially exploded, perspective view of the apparatus of FIG. 1 with the drawer, dressing stone holder, and liquid coolant pump removed.

Referring to the drawings, automatic saw apparatus 10 is shown comprising a housing 12, a control panel 14 and a first shaft 16 which holds a circular saw blade 18, said saw blade and shaft being rotatable by a motor 20 (FIG. 3) underneath shaft 16 and connected to motor 20 by belt 22.

A second shaft and load cell 24 carries a transversely mounted specimen arm 26. Specimen arm 26 defines a transverse dovetail aperture 27 for receiving a chuck 28 of conventional design which, in turn, holds the specimen of workpiece 30 in a position to be engaged by saw blade 18, when shaft 24 rotates arm 26 so that the saw blade and workpiece 30 engage. As previously stated, the workpiece 30 may be any material of which sliced sections are required such as silicon rods, sections of bone, wood, mineral, or the like.

FIGS. 3 through 7 show the second shaft and load cell 24 which carries rotatable specimen arm 26, in various views. Second shaft 24 extends through a pair of support plates 32 in longitudinally slidable and rotatable manner. The longitudinal sliding and rotation of second shaft 24 is governed by two different systems. Also, second shaft 24 comprises a highly straight and concentric stainless steel rod (FIG. 7) in which an annular portion 34 has been cut away and replaced with potting compound. A pair of opposed, electronic strain measuring members 36 are positioned on the resulting integral section 38 of second shaft 24, which section 38 is of reduced diameter, for example a highly straight and concentric diameter of 0.250 inch, compared with an overall diameter of the second shaft 24 of 0.9990–0.9995 inch. Wire 40 communicates with strain measuring members 36 to convey signals from the strain gauge to a microprocessor in the apparatus for control of the position of second shaft 24 and arm 26 as a function thereof. Such a strain gauge is thus adapted to detect torsional strain, particularly the torsion imparted by the pressure of the saw 18 against the workpiece 30 as transferred through arm 26 and directly read as a torsion in second shaft 24.

Second shaft 24 and arm 26 may be rotated between desired positions by the following mechanism. Motor 42 is carried on one of the support plates 32, being connected to shaft 44, which, in turn, connects with a lower aperture 46 of pivot linkage assembly 48. Key 49 rotationally locks shaft 44 with assembly 48. This pivot linkage assembly 48 comprises two sets of parallel, pivotally attached bars 50, 52, which may be thus rotated together between various parallelogram-shaped positions so that as shaft 44 rotates the lower bar 50, the upper bar 50 rotates with it in parallel relationship, impelled by bars 52, with pivoting taking place at the four corner pivots 54.

Rotary shaft 56 (FIGS. 5 and 6) connects with aperture 58 of upper bar 50 (FIGS. 4 and 6), being appropriately keyed to rotate with the rotation of upper bar 50. Thus, rotary shaft 56 rotates in accordance with the action of gear motor 42.

Figure 4:
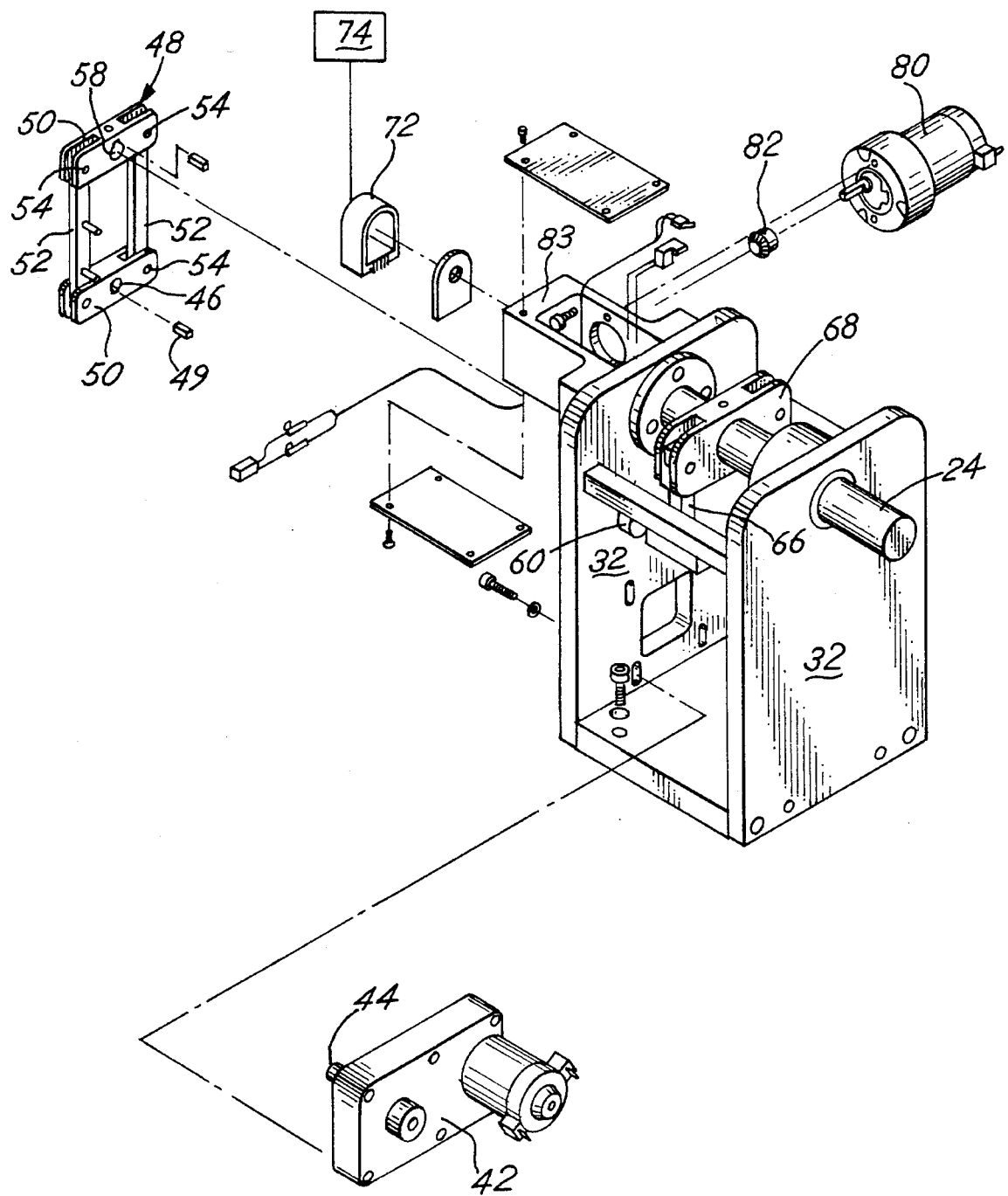
FIG. 4 is a further exploded, perspective view of the second rotatable shaft, its housing, and related parts.
Figure 5:
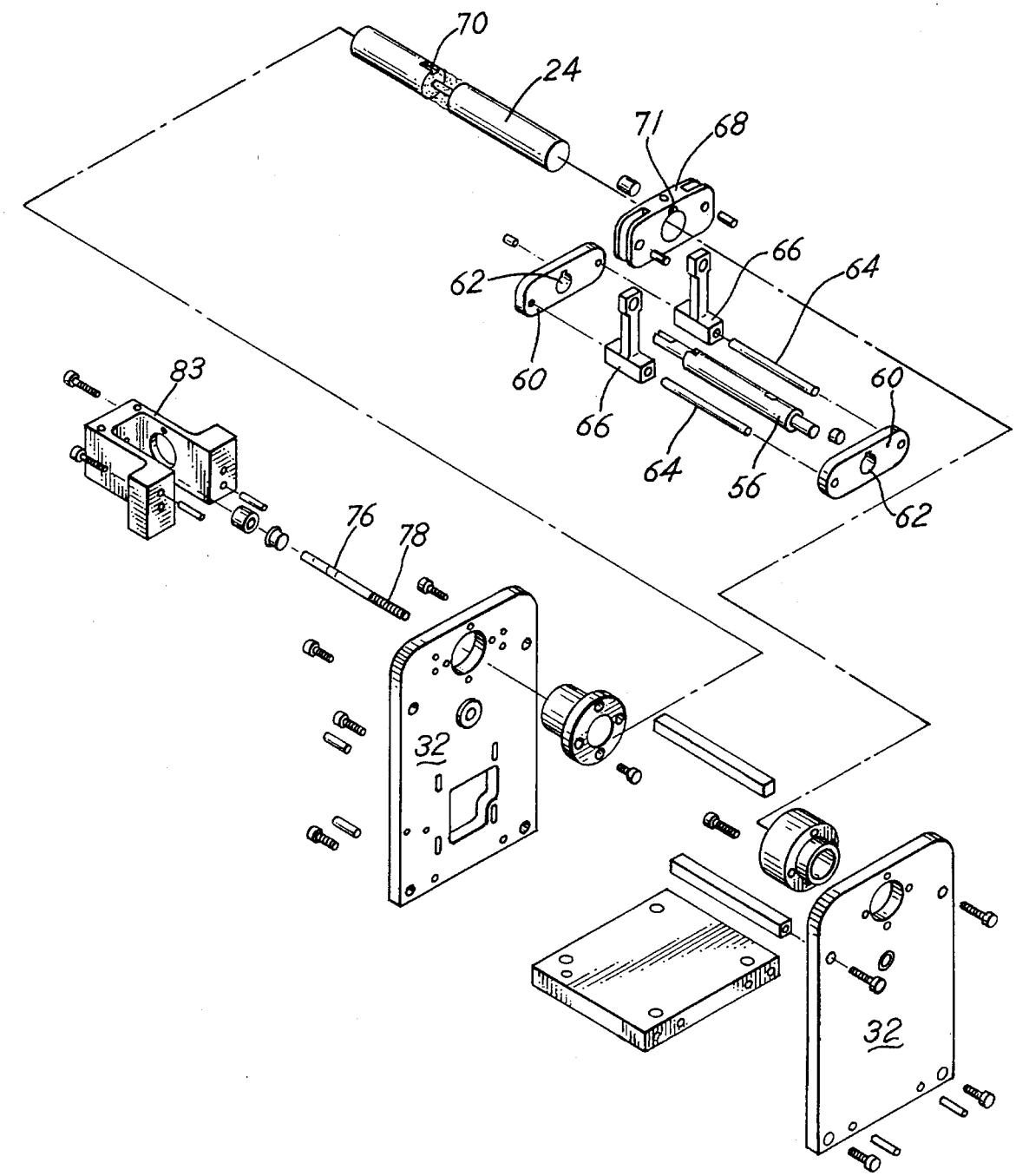
FIG. 5 is a further exploded, perspective view of some of the components of FIG. 4.

As shown in FIGS. 4 and 5, rotary shaft 56 carries a pair of flange members 60 in keyed relationship, which thus rotate with rotary shaft 56, being centrally attached to shaft 56 through apertures 62. Flanges 60 are, in turn, attached near their peripheries to lateral shafts 64, which shafts extend through sliding linkages 66. Sliding linkages 66 are in pivotal communication with opposed ends of main pivot linkage 68.

Second shaft 24 connects in keyed relationship through keyways 70, 71 with main pivot linkage 68, so that the rotation of second shaft 24 is controlled by the action of gear motor 42. A rotary encoder 72 of conventional, commercial design may be linked with an end of shaft 24, and connected to a microprocessor 74 (FIG. 4) which thus is capable of electronically sensing the rotational position of second shaft 24 and arm 26. This rotational position may then be adjusted by signals sent from microprocessor 74 to gear motor 42 in accordance with the program of the apparatus.

Furthermore, second shaft 24 and arm 26 carried thereon may be longitudinally moved as well as rotated. This system is particularly shown in FIG. 6, where second shaft 24 is shown to have a central, threaded bore 74 which mates with shaft 76 having a worm gear section 78 in threaded engagement with central bore 74. Gear motor 80 (FIG. 4) rotates gear 82 which, in turn, mates with gear 84 mounted on shaft 76 (FIG. 6).

Thus, as gear motor 80 rotates gear 82, shaft 76 correspondingly rotates, driven by gear 84. The effect of this is twofold. Second shaft 24 is threadedly advanced or retracted by this action, depending on the direction of rotation of shaft 76. At the same time, rotary encoder 72 monitors the rotation of shaft 76 to obtain a direct readout of the rotational position of second shaft 24, which is converted to a signal and sent to microprocessor 74.

Thus, the longitudinal and rotational positions of second shaft 24, and its carried arm 26 and workpiece 30, can be controlled, varied, and monitored in an automatic manner, as set for example by commands provided through control panel 14. Through this, the width of the various slices of workpiece 30 cut by saw 18 may be carefully controlled and monitored. Simultaneously, the rotational position of second shaft 24 is separately and independently controlled by gear motor 42 through connection with pivot linkage assembly 48, rotary shaft 56, sliding linkages 66, and main pivot linkage 68, as previously described.

As these operations are taking place, the speed of first shaft 16, carrying saw blade 18 can be monitored by rotary sensor 84 (FIG. 3), the readout of which may also be sent to microprocessor 74 to provide desired control of the saw blade rotational velocity in a manner similar to that described in the previously cited patent.

Figure 1:
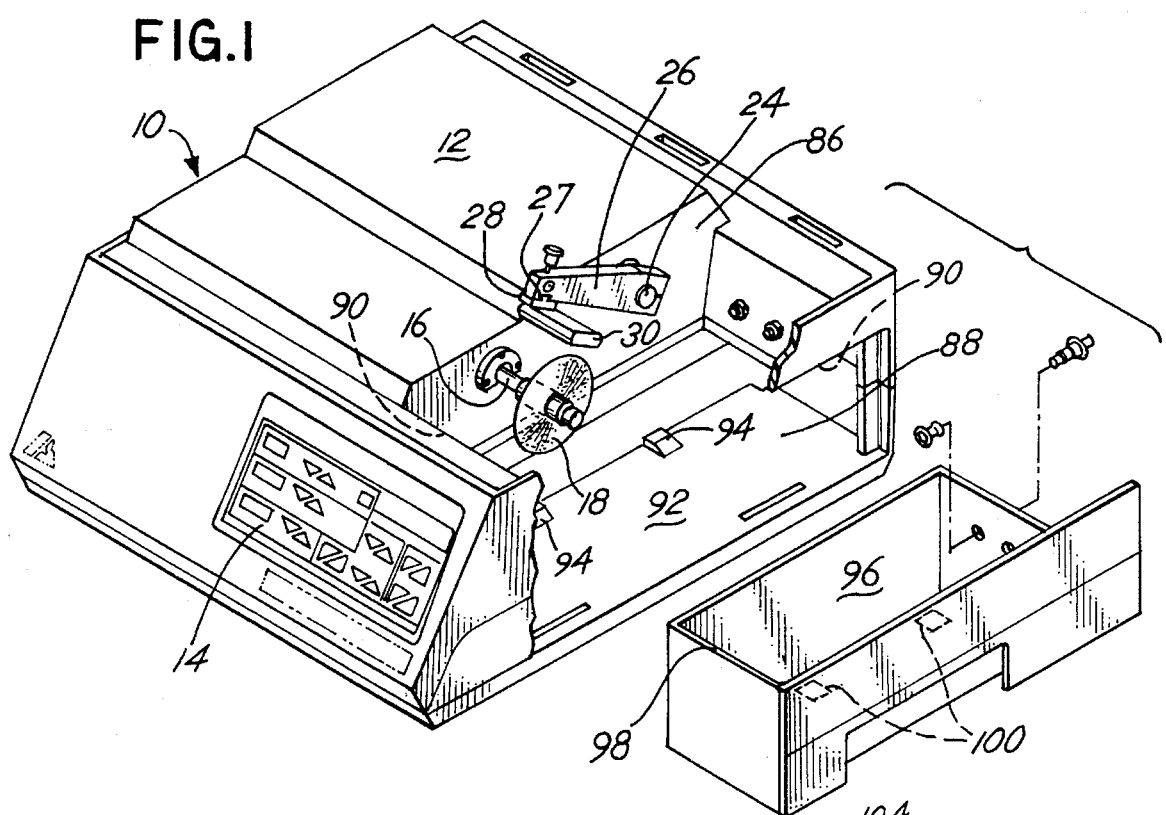
FIG. 1 is a perspective view of the automatic saw of this invention, with its coolant liquid drawer removed.

Turning again to FIG. 1, the automatic saw of this invention has first and second shafts 16, 24 that project through a wall 86 of housing 12. An enclosure 88 is defined having an open sidewall as shown, a peripheral lip 90, and a floor 92. Thus, arm 26 and saw blade 18 are carried in the enclosure, which includes the situation where particularly arm 26 is slightly above the enclosure, which has an open top.

Floor 92 defines one or more elevating cams 94 at a position which is opposed to the open sidewall.

A water-tight, open-top drawer 96, having a peripheral rim 98, is slidably movable through the open sidewall, to be cammed upwardly by cams 94 when the drawer reaches its inward position. This may be facilitated by the presence of mating cams 100, which engage cams 94 to elevate drawer 96 into its final, closed configuration within the enclosure, to cause rim 98 to engage peripheral lip 90 about the periphery thereof, to provide a seal for coolant liquid carried in the drawer.

Figure 2:
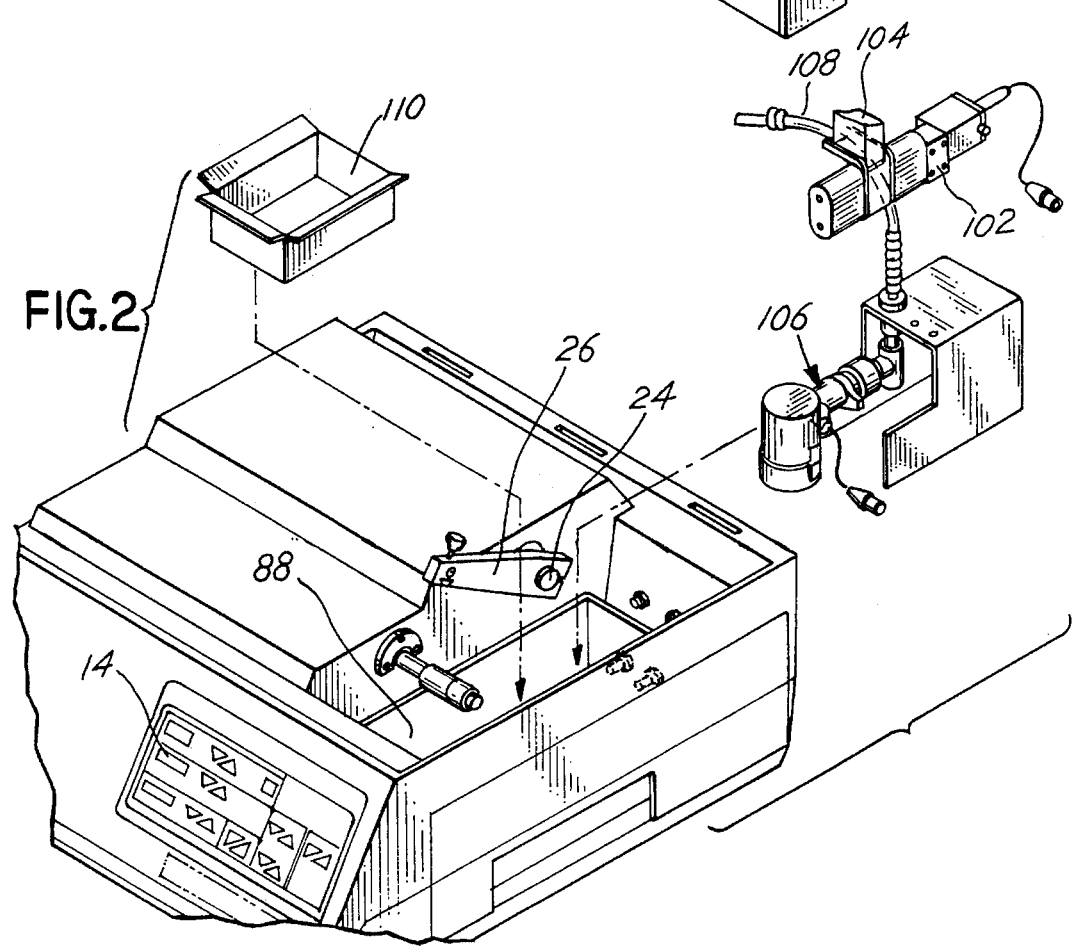
FIG. 2 is a perspective view of the automatic saw of FIG. 1 with the coolant liquid drawer inserted, and also showing the pump for applying coolant liquid to the saw blade, and the dressing stone holder which is positioned in or above the drawer.

As shown in FIG. 2, a chuck 102 for a dressing stone 104 is provided, to be positioned within enclosure 88 so that the saw blade 18 engages dressing stone 104. The saw blade is cleaned in this manner to provide a better cut of the workpiece 30. Chuck 102 may advance or retract stone 104 as desired to engage saw blade 18.

Additionally, pumping apparatus 106 is positioned on the floor 92 of enclosure 88 to pump cooling liquid carried in drawer 96, to convey it through hose 108 onto the serrated teeth of saw 18 for cooling and cleaning action.

Mesh container 110 (see FIG. 2) is provided to sit below the saw blade, to catch fragments of the specimen during the sawing process.

Thus, improvements in an automatic saw are provided, in which the basic functioning of the automatic saw described in the previously cited patent is improved for more accurate cutting and better data.

The above has been offered for illustrative purposes only, and is not intended to limit the scope of the invention of this application, which is as defined in the claims below.

That which is claimed is:

1. An automatic saw for cutting through a workpiece which comprises, a rotatable saw blade mounted on a first shaft, a saw blade drive motor for rotating said first shaft, load cell means providing an electrical output signal corresponding to a sensed load, arm means for carrying said workpiece, and arm drive means for moving said arm means toward and away from said saw blade, said arm drive means being controlled in response to said electrical output signal, said arm means being carried on a second rotatable shaft, said second shaft comprises said load cell means positioned to provide said electrical output signal in a manner responsive to torque load exerted on said second shaft through said arm means.

2. The automatic saw of claim 1 in which said second shaft is connected to rotary encoder means, whereby the position of said arm means may be electronically sensed and controlled.

3. The automatic saw of claim 1 in which said second shaft is longitudinally movable; threaded means for longitudinally advancing and retracting said second shaft between predetermined positions; and motor means for operating said threaded means to advance and retract said second shaft.

4. The automatic saw of claim 3 in which said threaded means comprises a worm gear operable in a longitudinal, threaded aperture defined in an end of the second shaft, whereby rotation of said worm gear causes longitudinal movement of said second shaft and said arm means carried thereon.

5. The automatic saw of claim 1 in which said arm means defines a transverse dovetail aperture to carry a specimen-holding chuck for sawing.

6. An automatic saw for cutting through a workpiece which comprises, a rotatable saw blade mounted on a first shaft, a saw blade drive motor for rotating said first shaft, load cell means providing an electrical output signal corresponding to a sensed load, arm means for carrying said workpiece, and arm drive means for moving said arm means toward and away from said saw blade, said arm drive means being controlled in response to said electrical output signal, said arm means being carried on a second rotatable shaft, said second shaft comprises said load cell means positioned to provide said electrical output signal in a manner responsive to torque load exerted on said second shaft through said arm means, in which said second shaft comprises a straight, concentric stainless steel rod which defines an integral section of a reduced diameter which is no more than about half the diameter of the remaining shaft, said integral section being spaced from opposed ends of said second shaft, and strain measuring means carried on said integral section.

7. An automatic saw for cutting through a workpiece which comprises, a rotatable saw blade mounted on a first shaft, a saw blade drive motor for rotating said first shaft, load cell means providing an electrical output signal corresponding to a sensed load, arm means for carrying said workpiece, and arm drive means for moving said arm means toward and away from said saw blade, said arm drive means being controlled in response to said electrical output signal, said arm means being carried on a second rotatable shaft, said second shaft comprises said load cell means positioned to provide said electrical output signal in a manner responsive to torque load exerted on said second shaft through said arm means, in which said first and second shafts have portions that project through a housing wall defining an enclosure having an open sidewall, a peripheral lip, and a floor, said first and second shaft portions respectively carrying said saw blade and said arm means in said enclosure, said floor defining at least part of elevating cam means at a position opposed to said open sidewall, and a water-tight, open-top drawer having a rim, slidably movable through said open sidewall, to be cammed upwardly by said elevating cam means to cause said rim to engage said peripheral lip to provide a seal for coolant liquid carried in said drawer.

8. The automatic saw of claim 7 in which dressing stone holding means are positioned in said drawer in the enclosure in a position whereby said saw blade mounted on the first shaft engages a dressing stone carried by said holding means.

9. An automatic saw for cutting through a workpiece which comprises: a rotatable saw blade mounted on a first shaft, a saw blade drive motor for rotating said first shaft, load cell means providing an electrical output signal corresponding to a sensed load, arm means for carrying said workpiece, arm drive means for moving said arm means toward and away from said saw blade, said arm drive means being controlled in response to said electrical output signal, said arm means being carried on a second rotatable shaft having ends, said second shaft comprises said load cell means positioned to provide said electrical output signal in a manner responsive to torque load exerted on said second shaft through said arm means, in which said second shaft is also longitudinally movable, threaded means for longitudinally advancing and retracting said second shaft between predetermined positions, and motor means for operating said threaded means to advance and retract said second shaft; said second shaft comprising a straight, concentric stainless steel rod which defines an integral section of a reduced diameter which is no more than about half the diameter of the remaining shaft, said integral section being spaced from the second shaft ends, and strain measuring means carried on said integral section.

10. The automatic saw of claim 9 in which said threaded means comprises a worm gear operable in a longitudinal, threaded aperture defined in one of said ends of the second shaft, whereby said rotation of said worm gear causes longitudinal movement of said second shaft and said arm means carried thereon.

11. The automatic saw of claim 10 in which said first and second shafts have portions that project through a housing wall defining an enclosure having an open sidewall, a peripheral lip, and a floor, said first and second shaft portions respectively carrying said saw blade and said arm means in said enclosure, said floor defining at least part of elevating cam means at a position opposed to said open sidewall, and a watertight, open-top drawer having a rim, slidably movable through said open sidewall, to be cammed upwardly by said elevating cam means to cause said rim to engage said peripheral lip to provide a seal for coolant liquid carried in said drawer.

12. The automatic saw of claim 9 in which dressing stone holding means are positioned in said drawer in the enclosure in a position whereby said saw blade mounted on the first shaft engages a dressing stone, and means carried in said dressing stone holding means for advancing and retracting said holding means to move said dressing stone for optimum engagement with the saw blade.

13. The automatic saw of claim 9 in which said second shaft is connected to rotary encoder means, whereby the position of said arm means may be electronically sensed and controlled.

14. The automatic saw of claim 9 in which said arm means defines a transverse dove tail aperture to carry a specimen-holding chuck for sawing.

15. An automatic saw for cutting through a workpiece which comprises: a rotatable saw blade mounted on a first shaft, a saw blade drive motor for rotating said first shaft, arm means for carrying said workpiece, arm drive means for moving said arm means toward and away from said saw blade, said arm means being carried on a second rotatable shaft, said second shaft being longitudinally movable, threaded means for longitudinally advancing and retracting said second shaft between predetermined positions, said threaded means comprising a worm gear operable in a longitudinal, threaded aperture defined in an end of the second shaft, whereby rotation of said worm gear causes longitudinal movement of said second shaft and said arm means carried thereon, and motor means for operating said threaded means to advance and retract said second shaft, in which said second shaft is connected to rotary encoder means, whereby the position of said arm means may be electronically sensed and controlled.

* * * * *